US012559344B2

(12) United States Patent
Thoeny et al.

(10) Patent No.: US 12,559,344 B2
(45) Date of Patent: Feb. 24, 2026

(54) ELEVATOR CONTROLLER FOR LEVELING PROCESS OPTIMIZATION

(71) Applicant: CEDES AG, Landquart (CH)

(72) Inventors: Christian-Erik Thoeny, Einsiedln (CH); James O'Laughlin, Belle Plaine, MN (US); Klims Saikins, Chur (CH); Martin Hardegger, Sargans (CH); Martina Kühne, Heerbrugg (CH)

(73) Assignee: Cedes AG, Landquart (CH)

( * ) Notice: Subject to any disclaimer, the term of this patent is extended or adjusted under 35 U.S.C. 154(b) by 0 days.

(21) Appl. No.: 19/058,219

(22) Filed: Feb. 20, 2025

(65) Prior Publication Data

US 2025/0197165 A1 Jun. 19, 2025

Related U.S. Application Data

(63) Continuation of application No. PCT/EP2023/072360, filed on Aug. 14, 2023.

(Continued)

(30) Foreign Application Priority Data

Aug. 26, 2022 (EP) .................................... 22192259

(51) Int. Cl.
*B66B 1/40* (2006.01)
*B66B 1/28* (2006.01)
*B66B 1/34* (2006.01)

(52) U.S. Cl.
CPC .................. *B66B 1/40* (2013.01); *B66B 1/28* (2013.01); *B66B 1/3415* (2013.01); *B66B 1/3492* (2013.01)

(58) Field of Classification Search
CPC ....... B66B 1/24; B66B 1/28–285; B66B 1/30; B66B 1/32; B66B 1/34–3423;

(Continued)

(56) References Cited

U.S. PATENT DOCUMENTS

| | | | | |
|---|---|---|---|---|
| 6,161,652 A * | 12/2000 | Kostka | B66B 1/425 187/291 |
| 9,981,825 B2 * | 5/2018 | Hovi | B66B 5/0037 |
| 2022/0017331 A1 * | 1/2022 | Saito | B66B 1/3446 |

FOREIGN PATENT DOCUMENTS

| | | |
|---|---|---|
| CN | 112723059 A | 4/2021 |
| EP | 1 273 547 A1 | 1/2003 |

OTHER PUBLICATIONS

International Preliminary Examination Report (with Chapter II Claims) (Application No. PCT/EP2023/072360) dated Jun. 10, 2024 (with English translation) (31 pages).

* cited by examiner

*Primary Examiner* — Christopher Uhlir

(74) *Attorney, Agent, or Firm* — BURR PATENT LAW, PLLC

(57) ABSTRACT

The controller according to the invention is a controller for optimizing the leveling process (leveling) of an elevator car at a stopping point for an elevator having an elevator controller which controls the stop of the car at a stopping point as a function of a specified distance X to the stopping point, wherein the controller is designed, during each of at least two, in particular at least three journeys, to record a set of at least one same measured value, to determine a change dX or a changed distance X' as a function of the set of the current journey and at least one past journey and to output the changed value X' or the difference dX to the specified distance X.

14 Claims, 4 Drawing Sheets

Related U.S. Application Data

(60) Provisional application No. 63/374,380, filed on Sep. 2, 2022.

(58) Field of Classification Search
CPC ...... B66B 1/3446–3461; B66B 1/3492; B66B 1/36; B66B 1/40; B66B 1/42; B66B 1/44; B66B 5/00; B66B 5/0006; B66B 5/0018; B66B 5/02
See application file for complete search history.

ELEVATOR CONTROLLER FOR LEVELING PROCESS OPTIMIZATION

CROSS REFERENCE TO RELATED APPLICATIONS

This application is a continuation of International Application No. PCT/EP2023/072360 filed Aug. 14, 2023, which designated the United States, which claims the benefit of Provisional Application No. 63/374,380, filed Sep. 2, 2022, and European Application No. 22192259.4, filed Aug. 26, 2022, the entireties of which are incorporated herein by reference.

FIELD OF THE INVENTION

The present invention relates to a controller for optimizing the leveling process (leveling) of an elevator car at a stopping point.

BACKGROUND OF THE INVENTION

Controllers of the type mentioned are known from the prior art, which control the positioning of the elevator car at a stopping point as a function of a specified distance to the stopping point. A system for adapting a velocity is known from EP 1 273 547 A1, which takes place from the beginning of the braking to the end of the braking process as a function of the movement distance. Moreover, a system for controlling the positioning process in elevators of moderate velocity is known from CN 112 723 059 A.

SUMMARY OF THE INVENTION

It is the object of the present invention to provide an improved controller.

The controller according to the present invention is a controller for optimizing the leveling process (leveling) of an elevator car at a stopping point for an elevator having an elevator controller which controls the stop of the car at a stopping point as a function of a specified distance X to the stopping point, wherein the controller is designed, during each of at least two, in particular, at least three journeys, to record a set of at least one same measured value, to determine a change dX or a changed distance X' as a function of the set of the current journey and at least one past journey and to output the changed value X' or the difference dX to the specified distance X.

This can form the advantage that the duration of the positioning process and/or the location of the positioning of the elevator car is optimized. This can form the advantage that the leveling process remains at essentially equal length for each journey. This can form the advantage that readjusting the position of the elevator car at the stopping point can be omitted. This can form the advantage that these advantages are formed even if the behavior of the elevator does not remain uniform. This can form the advantage that these advantages are formed even if the normal journey velocity, and/or the acceleration and/or the deceleration of the elevator changes. This can form the advantage that these advantages are formed even if a hydraulic elevator is heating up.

At least two journeys are necessary to select the values for the calculation of X' or dX from the current or the past journey. At least 3 journeys are advantageous to select the values for the calculation of X' or dX exclusively from past journeys. At least 4, 5, 6, 7, 8, 9, or 10 journeys are even more advantageous. 32 past journeys are advantageous to achieve particularly good results. At least one same measured value means that at least one or more identical measurements are performed.

The controller is a control unit and can be a device.

A stop is a stop at a stopping point at a story of the building, in particular, for the typical entry and exit of passengers into or out of the car. A journey is a journey of the elevator car between two successive stops. A journey typically comprises the successive phases of: stop, accelerate until reaching the normal travel velocity, normal travel velocity, deceleration for velocity reduction to the leveling velocity, leveling process (leveling), stop. The current journey is the present journey for which in particular, the change dX or the changed distance is to be applied. A past journey is a journey which has taken place before the current journey. The normal travel velocity is the essentially constant velocity of a journey after the acceleration phase and before the phase of the velocity reduction and the leveling process. The leveling process (leveling) is the phase of a journey after the end of the normal journey velocity between the end of the deceleration for velocity reduction and the stop and can comprise the leveling and the readjustment of the elevator car at the stopping point. The leveling process typically has an essentially constant leveling velocity which is less than the normal travel velocity. The specified distance X in front of the stopping point can be a mechanical or virtual marking in the shaft, wherein the virtual marking can be a stored height marking of the height scale in the case of an absolute positioning system. The change dX and the changed distance X' relate to the distance X according to the relationship X'=X+dX. An absolute positioning system can be implemented by a measuring tape fastened in the shaft, a measuring sensor on the car, the stored positions, and an evaluation unit for the position specification of the car.

According to the present invention, the controller is designed to form a group from a set, which comprises at least the set and/or at least the main value of the set together with the change dX calculated from the set or the changed distance X', and to select a group of a past journey as a function of the main value of the current journey and the past journey, and to determine the change dX or the changed distance X' as a function of the selected group.

The main value of a set and/or the assigned group is a specific measured value or a function of specific measured values of the underlying set. In particular, the main value is a function of acceleration and normal travel velocity. In particular, the main value for the travel direction upward is the acceleration acc and for the travel direction downward is the essentially constant normal travel velocity vel.

A group can be a set. The main values of the past journeys and the change dX or the changed distance X' can then be calculated from the selected set of the selected journey at the time of the current journey.

The group can consist of the main values and the change dX or the changed distance X', which can then be calculated at the time of the assigned past journey.

This can form the advantage that the optimizing is particularly good.

The controller is preferably designed to select that group of a past journey, the main value of which has the least absolute difference from the main value of the current journey.

This can form the advantage that the accuracy of the positioning at the end of the leveling process is particularly high.

The controller is preferably designed to store groups in a memory up to a maximum number.

This can form the advantage that the memory requirement is reduced.

The controller is preferably designed, if the maximum number is not yet reached, to add all new groups to the memory and, if the maximum number is reached, to replace groups in the memory with groups of new journeys, in particular, to replace them if and, in particular, only if the value range of the main values is thus enlarged or the distribution of the main values becomes more uniform.

This can form the advantage that the memory is optimally utilized.

The controller is preferably designed to add groups of new journeys to the memory until the maximum number of groups in the memory is reached.

This can form the advantage that sufficient data for optimum control are rapidly provided.

The controller is preferably designed, in particular, if the maximum number of groups in the memory is reached, to replace a stored group with the group of a new journey, if the value range of the main values is thus enlarged, in particular, if the main value of the stored group has the least or greatest value of all stored groups and the main value of the new group is accordingly less or greater.

This can form the advantage that optimum data for optimum control are present and that the control behavior always improves.

The controller is preferably designed, in particular, if the maximum number of groups in the memory is reached and, in particular, if the main value of the group of the new journey is not less or greater than all main values in the memory, to replace a stored group with the group of a new journey, if the distribution of the main values in the memory thus becomes more uniform and, in particular, the sum of the squares of the distances between the successive main values in the memory becomes less, in particular, if the main value difference of the group of the new journey is less than the main value difference of a stored group having the same group position as the group position of the group of the new journey.

This can form the advantage that optimum data for optimum control are present and that the control behavior always improves.

The main value difference of a main value is the absolute difference of the main value and its standard value. The standard value of a main value is the sum of the least main value of all groups in the memory and the product of the group position of the main value and the group slope. The group position of a main value is the quotient, rounded to a whole number, of the difference of the main value to the least main value of all groups in the memory and the group slope. The group slope is the quotient of the difference of least and greatest main value of all groups in the memory and the maximum number.

The controller is preferably designed to add a time of an associated measured value to the group, and to delete the group from the memory again after a specific duration after the time.

This can form the advantage that groups, the values of which represent unfavorable outliers, are removed again after some time. This can increase the accuracy of the method.

The controller is preferably designed so that the specified distance X to the stopping point is the distance FS for initiating the velocity reduction or is the distance REL for switching off the drive.

This can form the advantage that the accuracy of the controller is particularly high.

The controller is preferably designed to record the specified value ldur for the desired duration of the leveling process (leveling) and, for the set, to record the measured values of mean acceleration until reaching the normal travel velocity acc, normal travel velocity of the car vel, mean deceleration for the velocity reduction dec, and velocity immediately before switching off the drive lvel, and to calculate the changed distance FS' as follows:

$$FS' = (lvel * ldur) + \left(\frac{vel^2 - lvel^2}{2 * dec}\right).$$

This can form the advantage that an optimum FS value is adopted.

The deceleration for the velocity reduction is a negative acceleration.

The controller is preferably designed, for the set, to record the measured value of the actual stopping position HP after the journey and to calculate the change dREL as follows:

$$dREL = (HP - FL),$$

wherein FL is the position of the stopping point.

This can form the advantage that a readjustment of the stopping position of the elevator car could still take place.

The controller is preferably designed to carry out the method separately for each direction of travel of the car, and, in particular, to carry it out with a separate memory.

This can form the advantage that the different behavior of the elevator for the journey upward or downward is taken into consideration. This improves the control behavior.

Further features of the present invention are indicated in the drawings.

The advantages mentioned in each case can also be implemented for feature combinations in the context of which they are not mentioned.

BRIEF DESCRIPTION OF THE DRAWINGS

Exemplary embodiments of the present invention are shown in the drawings and will be explained in more detail hereinafter. Identical reference signs in the individual figures designate elements corresponding to one another.

DETAILED DESCRIPTION OF THE INVENTION

Figure 1:
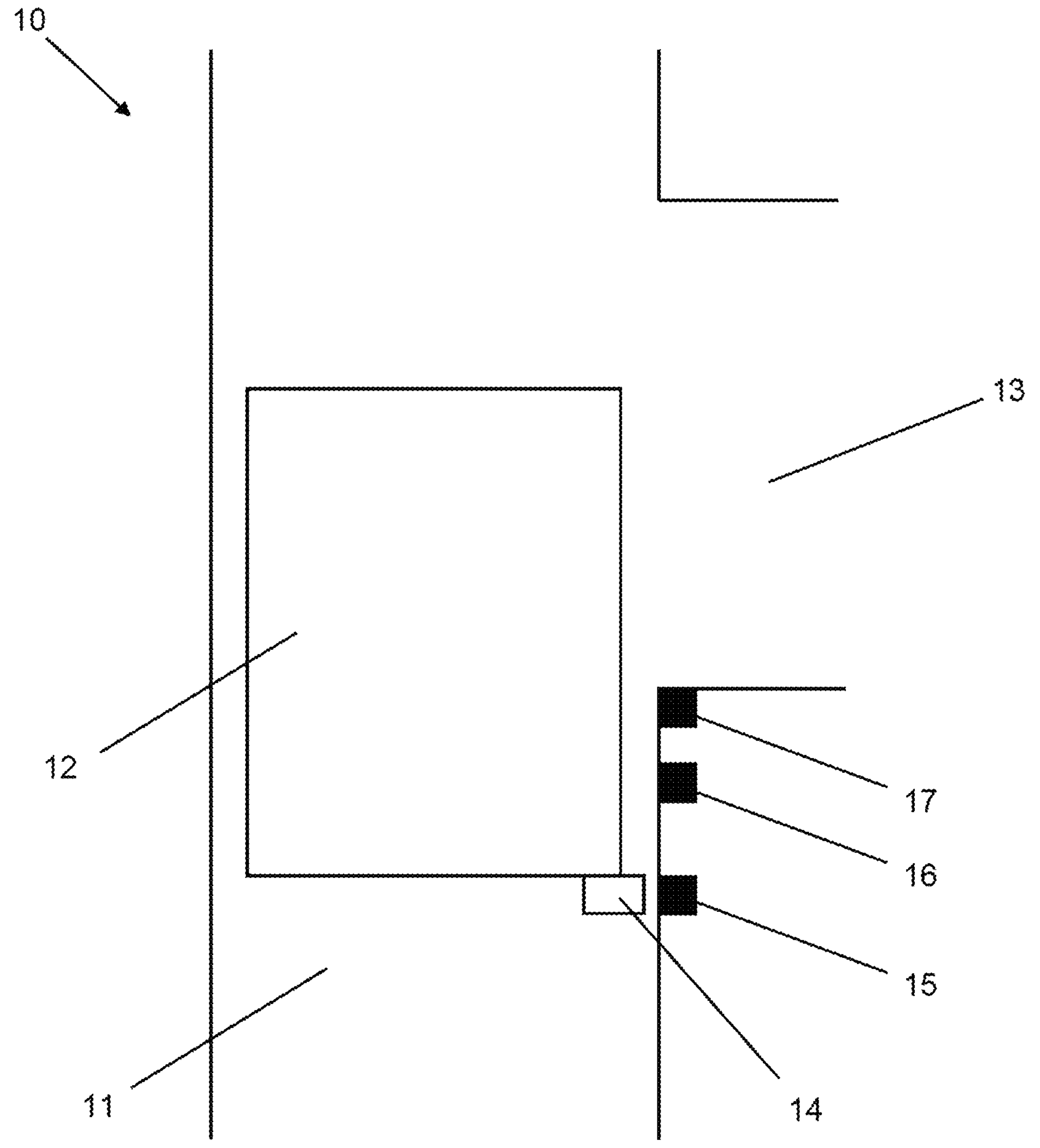
FIG. 1 shows an elevator with position markings.

FIG. 1 shows a hydraulic elevator having position markings. The elevator 10 has an elevator car 12 which moves vertically in an elevator shaft 11. The elevator shaft 11 has multiple stopping points 13. A position marking 17 for the stopping point, a position marking 16 for the distance REL from the stopping point 13 for switching off the drive for the stop at said stopping point, and a position marking 15 for the distance FS from the stopping point 13 for initiating the velocity reduction for the stop at said stopping point are in the elevator shaft 11. The position marking is a height specification in relation to a measuring tape in the shaft here. The elevator car 12 has a position sensor 14 for detecting the position markings.

Figure 2:
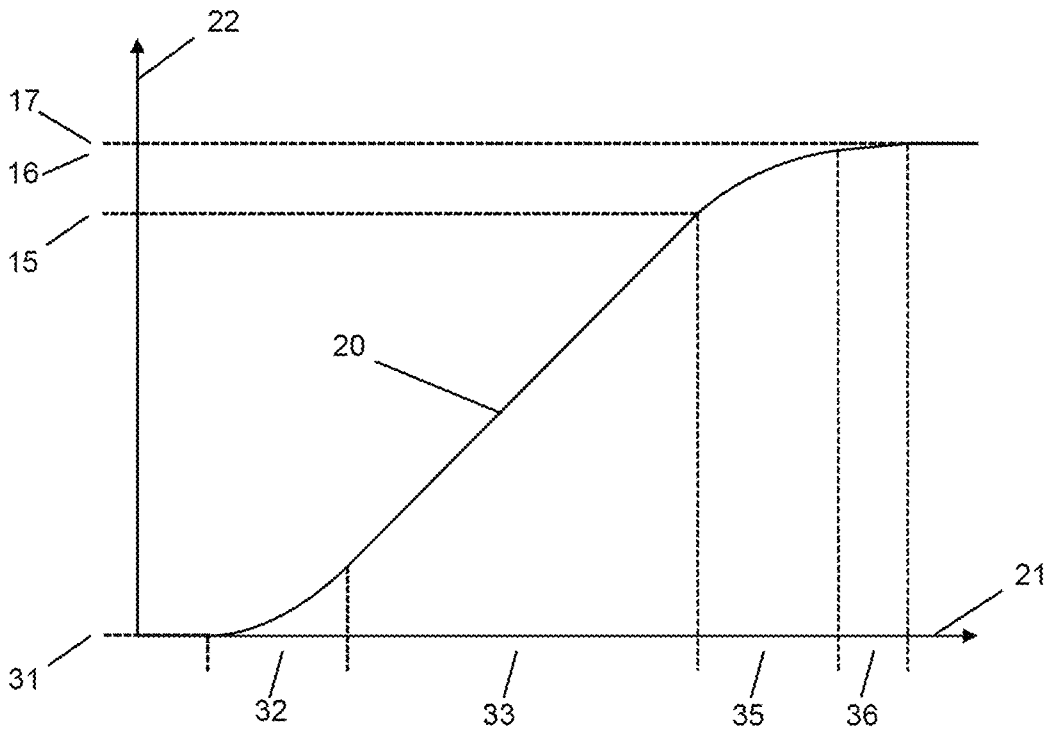
FIG. 2 shows a travel curve of the elevator.

FIG. 2 shows a travel curve 20 of the elevator according to FIG. 1. The travel curve 20 shows the journey from the stop at a stopping point located below the stopping point 13 to the stop at the stopping point 13. The horizontal time axis 21 shows the time curve and the vertical position axis 22 shows the position of the elevator car 12 in the elevator shaft 11 during a journey. After the start from the stop 31, a phase of the acceleration 32 at the mean acceleration acc, follows, then a phase at essentially constant normal journey velocity vel 33, then the detection of the position marking FS 15 to initiate the velocity reduction, then the phase of the velocity reduction 35 at the mean deceleration acceleration dec, and then the phase of the leveling process (leveling) 36 at the constant velocity lvel less than the constant normal travel velocity and the duration ldur. Toward the end of the leveling process, very close to the position of the stopping point, the detection of the position marking REL 16 takes place to switch off the drive. The stop of the elevator car then takes place at the position HP in the vicinity of or on the position marking FL 17 for the stopping point 13 at the stopping point 13.

To keep the leveling process 36 as equal in length and as short as possible and to avoid possible readjustment of the position of the elevator car 12 at the stopping point 13, the positioning of the position marking FS 15 is particularly important. The position of the position marking FS 15 is permanently provided in the elevator shaft in the prior art. This presumes uniform behavior of the elevator. Heating due to operation, changed environmental parameters, change of the shaft, or aging of the elevator can change the behavior of the elevator, however. This nonuniform behavior of the elevator can make a change of the position of the position marking FS 15 reasonable. This also applies for the position marking REL 16.

It has been shown that certain measured values for a journey can depend on a nonuniform behavior of the elevator and are helpful for a change of the position markings FS and/or REL.

It has been shown that the change of the position markings FS and REL during a journey, even before reaching the position markings, as a function of specific measured values can be reasonable.

It has been shown that the change of the position markings FS and REL during a journey, even before reaching the position markings, as a function of specific measured values from another journey can be reasonable. It has been shown that the selection of this other journey as a function of the similarity of certain measured values of the current journey to the other journey can be reasonable. A main value is defined for the purpose of this selection. This is one of the specific measured values or a function of specific measured values.

A specified value ldur is specified for the desired duration of the leveling process 36. A set of specific measured values is recorded for each journey. These are the mean acceleration until reaching the normal travel velocity acc, normal travel velocity of the car vel, mean deceleration for the velocity reduction dec, leveling velocity lvel, and the actual stopping position HP. The main value for journeys upward is the mean acceleration acc, for journeys downward it is the normal travel velocity vel.

Only journeys upward are considered hereinafter. For journeys downward, the algorithm has to be separately applied analogously. For journeys downward, additional position markings FS and REL are accordingly to be provided above the position marking for the stopping point.

During the current journey, the specific measured values are recorded so that the main value can be formed even before reaching the position markings FS and REL.

For past journeys, in each case from the set, a group consisting of the main value and the changed position values FS' and REL' is formed: FS' and REL' are calculated using $$FS' = FS - dFS = (lvel * ldur) + \left(\frac{vel^2 - lvel^2}{2 * dec}\right)$$

$$REL' = REL - dREL = REL - (HP - FL),$$

wherein FL is the position of the stopping point and dFS and dREL are the changes of the distances FS and REL.

Figure 3:
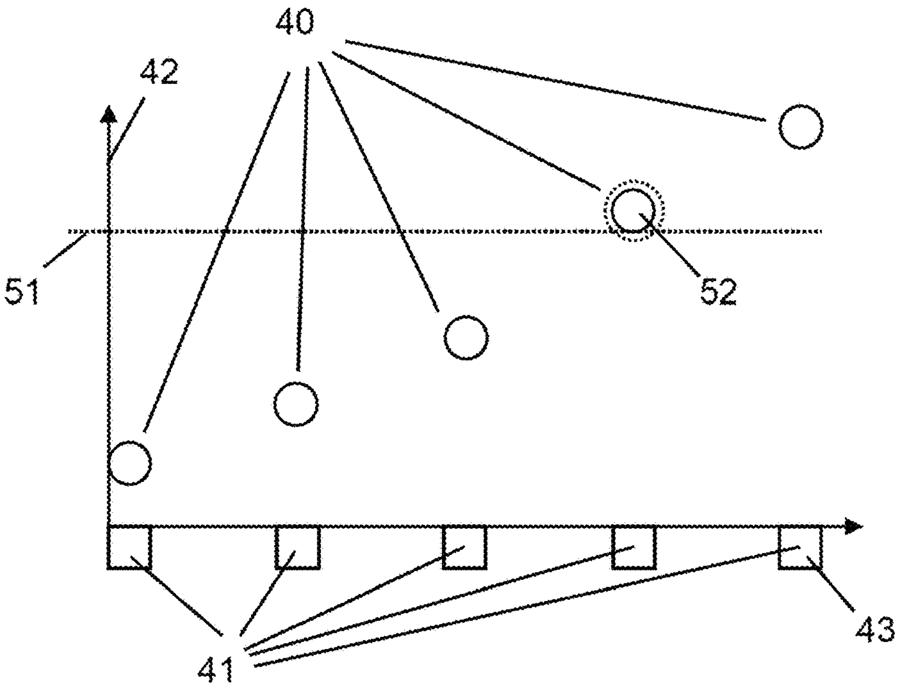
FIG. 3 shows selecting a main value for the control of the elevator.

FIG. 3 shows the selection of a main value to define the changed distances for the elevator according to FIG. 2. The horizontal axis shows progressive group positions 41, ordered according to main value, up to a maximum number of 5 different groups. The vertical axis shows the value of the main value. The circles 40 represent groups consisting of the main value and the changed position values FS' and REL', as calculated above, of past journeys which are stored in a memory. The memory contains a maximum number of 5 different past journeys here. The maximum number could favorably also be greater and could be 32, for example. The groups are shown here ordered rising according to the main value. The main value is the acceleration acc for the observed journeys upward.

As mentioned above, the main value of the current journey 51 is formed during the current journey, even before reaching the position markings FS and REL.

That group 52 is now selected, the main value 52 of which is closest to the main value of the current journey 51, thus has the least absolute difference.

The changed position values FS' and REL' formed from this selected group 52 are now applied for the current journey.

Figure 4:
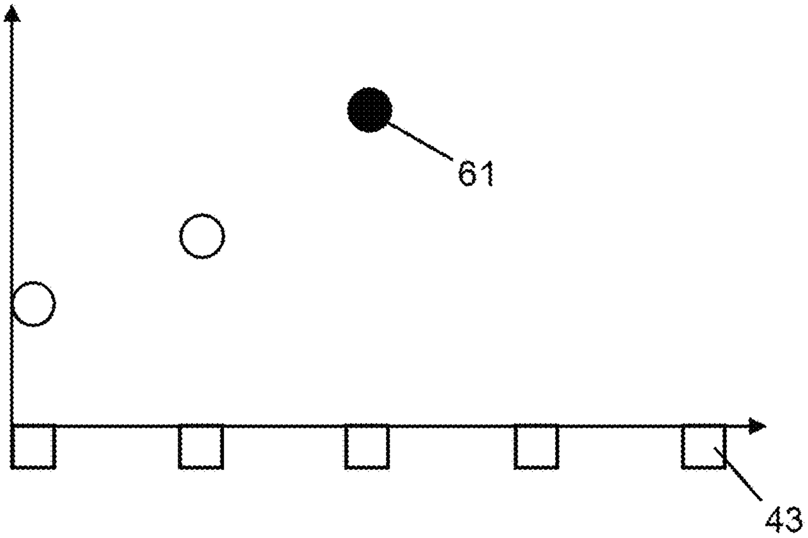
FIG. 4 shows adding a main value.

FIG. 4 shows the addition of a main value for the selection according to FIG. 3. The maximum number 43 of stored groups is not reached here. As long as the maximum number 43 of stored groups is not reached, the group from a new journey 61 is recorded in the memory. Accordingly, the new group 61 is recorded in the memory.

The number of the selection options for the selection thus becomes higher. The method thus becomes more reliable and more accurate.

Figure 5:
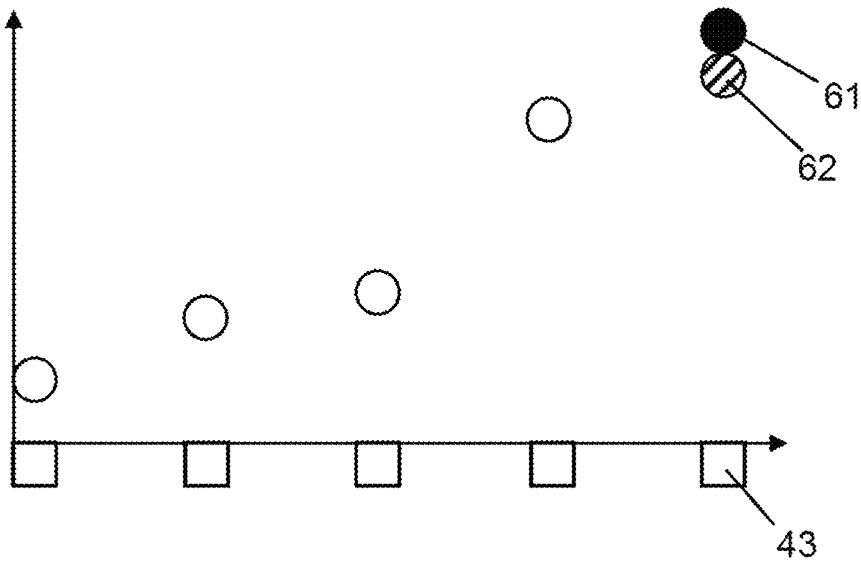
FIG. 5 shows replacing an extreme main value.

FIG. 5 shows the replacement of an extreme main value for the selection according to FIG. 3. The maximum number 43 of stored groups is reached here. The main value of the group of the current journey 61 is greater than the greatest main value of a stored group 62.

If the maximum number of stored groups 43 is reached, the group of a new journey 61 then replaces the stored group having the highest 62 or lowest main value if the main value of the new group is accordingly greater or less than the main value of the stored group.

Accordingly, the stored group 62 of a past journey is replaced by the group of the current journey 61.

The span of the value range for the main values of the stored groups thus increases. The method thus becomes more reliable and more accurate.

Figure 6:
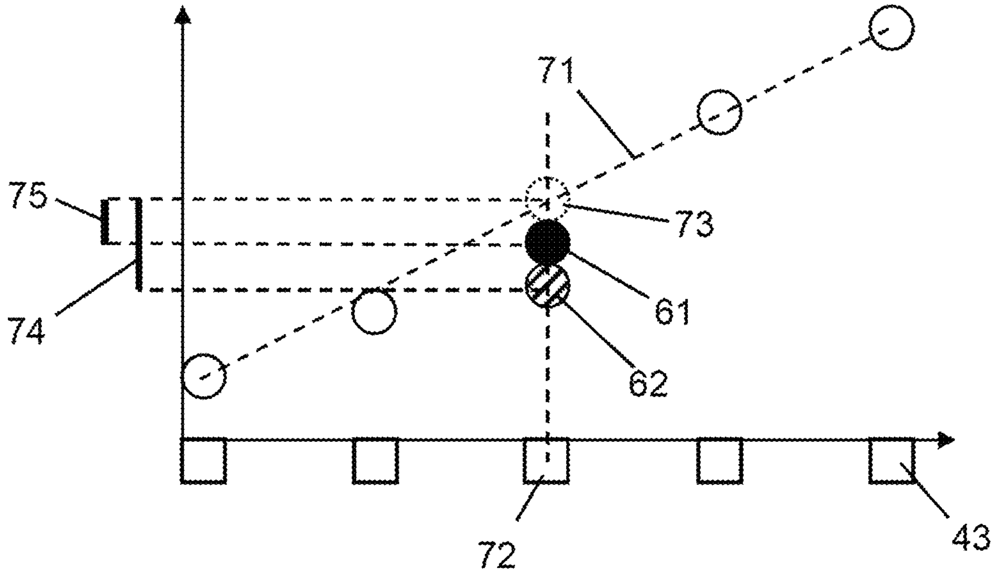
FIG. 6 shows replacing a non-extreme main value.

FIG. 6 shows the replacement of a non-extreme main value for the selection according to FIG. 3. The maximum number 43 of stored groups is reached here. The stored groups are ordered rising in group positions ordered according to the main value. The two groups having the greatest and the least main value form a slope straight line. The group of the current journey 61 is closer to the slope straight line than the stored group 62 of a past journey. The difference 75 of the new group of the current journey 61 from the main value 73 of the slope straight line 71 at the corresponding position 72 is less than the corresponding difference 74 of the stored group 62 of a past journey.

When the maximum number of stored groups 43 is reached, the group of a new journey 61 then replaces a stored group 62 if the distance of the new group 61 from the slope straight line is less than the distance of the stored group 62 from the slope straight line.

Accordingly, the new group of the current journey 61 replaces the stored group 62 of an earlier journey here.

The distribution of the main values in the memory thus becomes more uniform. The method thus becomes more reliable and more accurate.

LIST OF REFERENCE SIGNS

10 elevator
11 elevator shaft
12 elevator car
13 stopping point
14 position sensor
15 position marking for the distance FS
16 position marking for the distance REL
17 position marking for the stopping point
20 travel curve
21 time axis
22 position axis
31 stop
32 acceleration
33 normal travel velocity
35 velocity reduction
36 leveling process
38 stop
40 stored main values
41 progressive group positions of the main values
42 value axis of the main values of the groups
43 maximum number of groups
51 main value of the current journey
52 main value of the selected group
61 main value of the group to be newly added of the new journey
62 main value of the group to be replaced
71 group slope
72 group position
73 standard value of the group position
74 main value difference of the replacing group of the new journey
75 main value difference of the group to be replaced

The invention claimed is:

1. A controller for optimizing a leveling process of an elevator car at a stopping point for an elevator having an elevator controller which controls a stop of the car at a stopping point as a function of a specified distance X to the stopping point, and/or for an elevator car having a position sensor for detecting position markings and/or for an elevator having an absolute positioning system, comprising a measuring tape fastened in a shaft, a measuring sensor on the car, stored positions, and an evaluation unit for specifying a position of the car, wherein the controller is designed, during each of at least three journeys, to record a set of at least one same measured value, to determine a change dX or a changed distance X' of a set of a current journey and based on properties of at least one past journey and to output the changed distance X' or the changed dX to the specified distance X, wherein the controller is designed to form a group from the respective set, which comprises at least the set together with either the changed dX or the changed distance X' and/or at least a main value of the set together with either the changed dX or the changed distance X', and to select the corresponding group of a past journey as a function of a main value of the current journey and the past journey, wherein the main value of the set and/or the group assigned to the set is a specific measured value or a function of specific measured values of the underlying set:

is a function of acceleration and normal travel velocity and/or for a travel direction upward is an acceleration and for a travel direction downward is a normal travel velocity, and wherein the controller optimizes the leveling process of the elevator car at a stopping point for the elevator based on the change dX or the changed distance X'.

2. The controller as claimed in claim 1, wherein the controller is designed to select that group of a past journey, the main value of which has a least absolute difference from the main value of the current journey.

3. The controller as claimed in claim 1, wherein the controller is designed to store groups in a memory up to a maximum number.

4. The controller as claimed in claim 3, wherein the controller is designed, if the maximum number is not yet reached, to add all new groups of new journeys to the memory, and, if the maximum number is reached, to replace groups in the memory with groups of new journeys, to replace them only if a value range of the main values is thus enlarged or a distribution of the main values becomes more uniform.

5. The controller as claimed in claim 4, wherein the controller is designed to add groups of new journeys to the memory until the maximum number of groups in the memory is reached.

6. The controller as claimed in claim 4, wherein the controller is designed, if the maximum number of groups in the memory is reached, to replace a stored group with the group of a new journey, if the value range of the main values is thus enlarged, if the main value of the stored group has a least or greatest value of all stored groups and a main value of the new group is accordingly less or greater.

7. The controller as claimed in claim 4, wherein the controller is designed, if the maximum number of groups in the memory is reached and if the main value of the group of the new journey is not less or greater than all main values in the memory, to replace a stored group with the group of a new journey, if the distribution of the main values in the memory thus becomes more uniform and a sum of squares of distances between successive main values in the memory becomes less, if a main value difference of the group of the new journey is less than main value difference of a stored group having the same group position as a group position of the group of the new journey, wherein a main value difference of a main value is an absolute difference of the main value and its standard value, wherein the standard value of a main value is a sum of the least main value of all groups in the memory and a product of a group position of the main value and a group slope, wherein the group position of a main value is a quotient, rounded to a whole number, of a difference of the main value from the least main value of all groups in the memory and the group slope, wherein the group slope is the quotient of a difference of least and greatest main value of all groups in the memory and the maximum number.

8. The controller as claimed in claim 1, wherein the controller is designed to add a time of an associated measured value to the group formed from the respective set, and to delete the group formed from the respective set from the memory after a specific duration after the time.

9. The controller as claimed in claim 1, wherein the controller is designed so that the specified distance X to the stopping point is a distance for initiating a velocity reduction or is a distance for switching off the drive.

10. The controller as claimed in claim 9, wherein the controller is designed to record a specified value ldur for a desired duration of the leveling process and, for the respective set, to record measured values of mean acceleration until reaching the normal travel velocity acc, normal travel velocity of the car vel, mean deceleration for the velocity reduction dec, positioning velocity lvel, and to calculate the changed distance FS' as follows:

$$FS' = (lvel * ldur) + \left(\frac{vel^2 - lvel^2}{2 * dec}\right).$$

11. The controller as claimed in claim 1, wherein the controller is designed, for the respective set, to record the measured value of an actual stopping position HP after the current journey and to calculate the change dREL as follows dREL=(HP−FL), wherein FL is a position of the stopping point.

12. The controller as claimed in claim 1, wherein the controller is designed to carry out the method separately for each direction of travel of the car, and to carry it out using a separate memory.

13. An elevator having a controller as claimed in claim 1.

14. The elevator as claimed in claim 13, wherein the elevator is a hydraulic elevator.

* * * * *